No. 877,227. PATENTED JAN. 21, 1908.
A. TURNER & L. HOWARD.
MANURE SPREADING ATTACHMENT FOR WAGONS.
APPLICATION FILED MAR. 18, 1907.

2 SHEETS—SHEET 1.

Witnesses
J. Milton Jester
C. H. Griesbauer

Inventors
A. Turner
L. Howard
by H. R. Willson & Co.
Attorneys

No. 877,227. PATENTED JAN. 21, 1908.
A. TURNER & L. HOWARD.
MANURE SPREADING ATTACHMENT FOR WAGONS.
APPLICATION FILED MAR. 18, 1907.
2 SHEETS—SHEET 2.
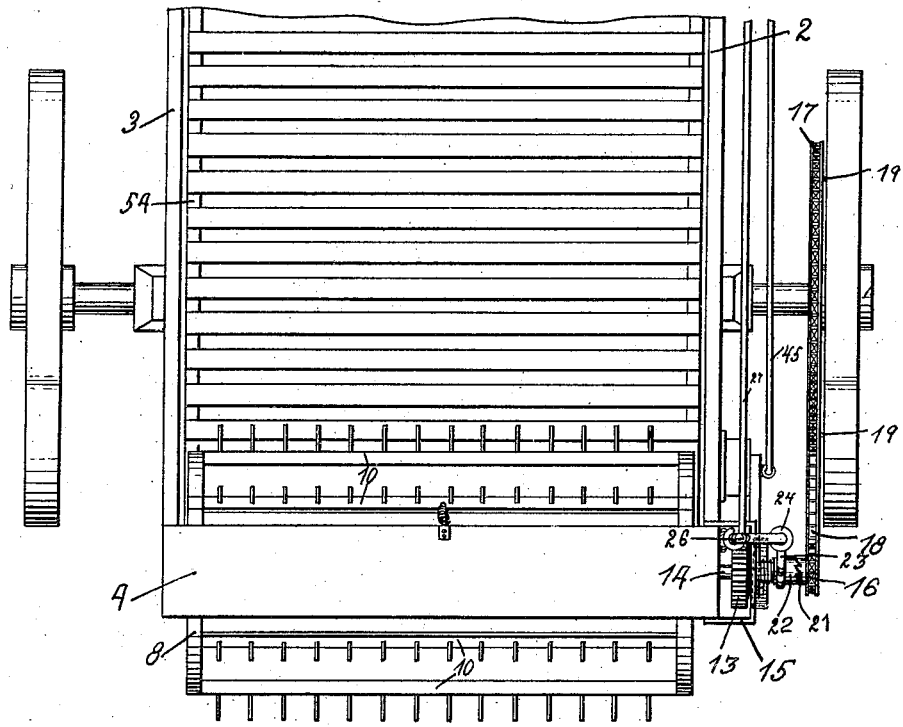
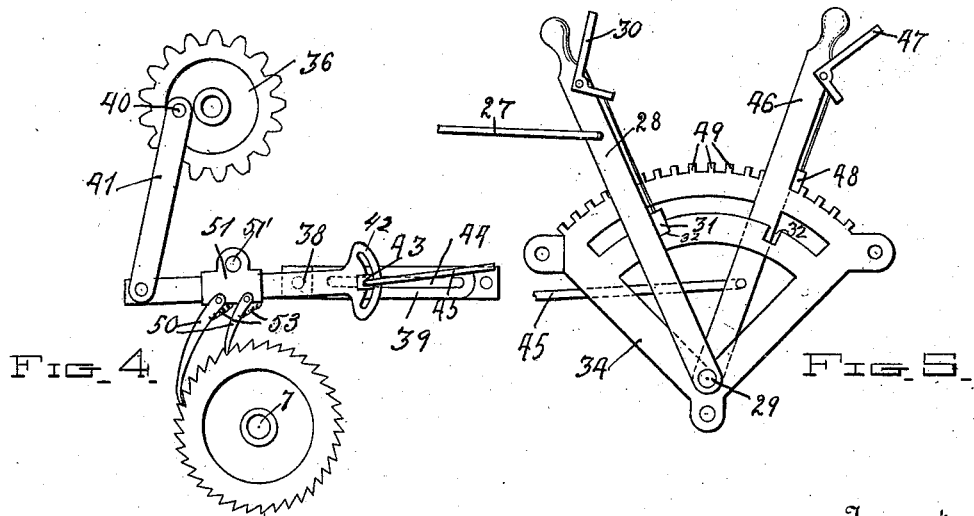
Witnesses
J. Milton Jester
E. H. Griesbauer
Inventors
A. Turner
L. Howard
by H. B. Willson & Co.
Attorneys

UNITED STATES PATENT OFFICE.

ALEXANDER TURNER AND LEE HOWARD, OF STILLWELL, ILLINOIS.

MANURE-SPREADING ATTACHMENT FOR WAGONS.

No. 877,227.   Specification of Letters Patent.   Patented Jan. 21, 1908.

Application filed March 18, 1907. Serial No. 363,012.

*To all whom it may concern:*

Be it known that we, ALEXANDER TURNER and LEE HOWARD, citizens of the United States, residing at Stillwell, in the county of Hancock and State of Illinois, have invented certain new and useful Improvements in Manure - Spreading Attachments for Wagons; and we do declare the following to be a full, clear, and exact description of the invention, such as will enable others skilled in the art to which it appertains to make and use the same.

This invention relates to manure spreaders and more particularly to devices of this kind which may be attached to wagons, and it has for its object to provide a device that can be readily applied and will quickly and effectively perform the work for which it is intended.

Figure 1:
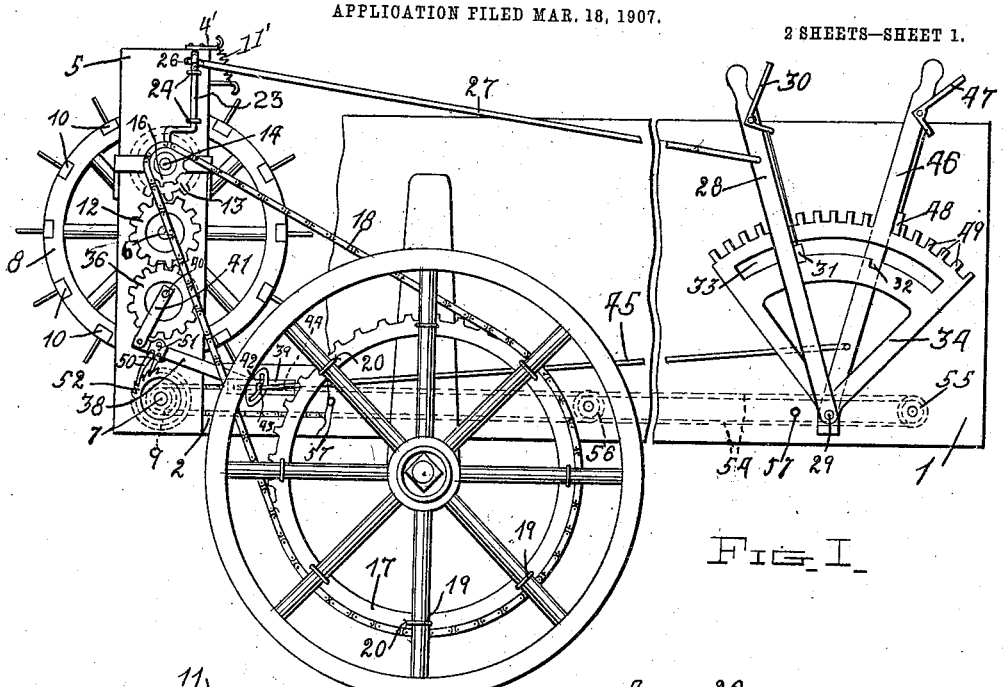
Figure 2:
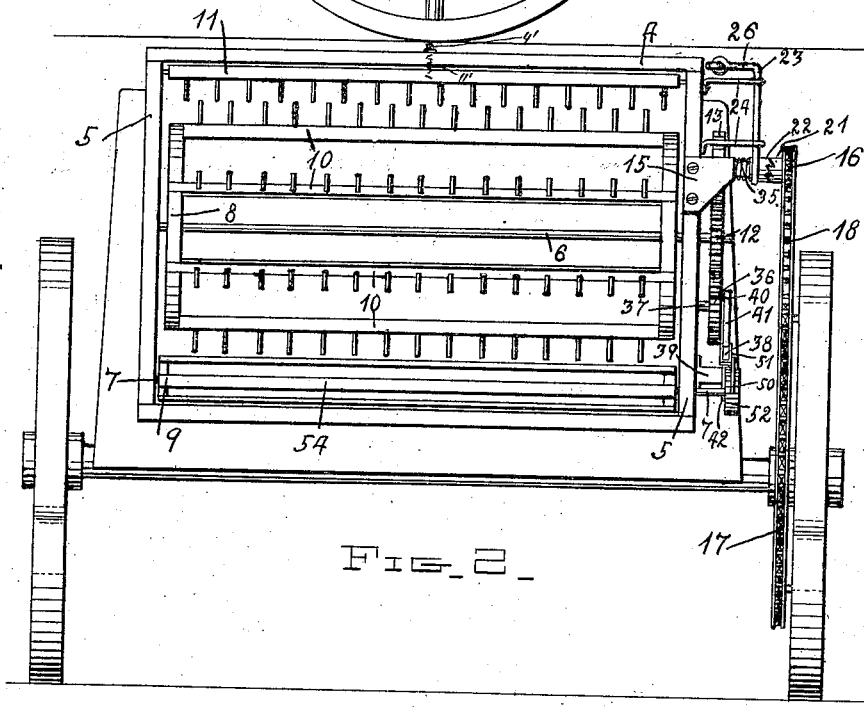

In the accompanying drawings which illustrate the invention,—Figure 1 is a side elevation of the invention; Fig. 2 is a rear end view; Fig. 3 is a broken top plan view; and Figs. 4 and 5 are enlarged side elevations or part of the operating and controlling mechanism.

Referring more particularly to the drawings, 1 indicates the body or bed of a wagon, to which our mechanism is applied.

While we contemplate the use of our manure spreader in connection with an ordinary wagon, it is shown in the drawings as mounted on a frame formed of longitudinally-extending side pieces 2 and 3, one or more cross pieces 4 and vertical end pieces 5 and 5', which frame is applied to the ordinary wagon by removing the body thereof and substituting the body carrying our manure spreader.

Journaled in the vertical end pieces are two shafts 6 and 7, upon which are secured rollers 8 and 9, the roller 8 being provided with ordinary toothed slats or bars 10. A toothed bar 11 is also journaled or pivotally-mounted in the upper ends of the vertical end pieces or posts 5 above the roller 8, and preferably held yieldingly in position by a spring 11', which engages with a hook or bracket 4'. A spur gear 12 is mounted on the shaft 6 at one end, with which a similar gear 13 mounted on a shaft 14 meshes. This shaft 14 is arranged outside the frame and journaled in the posts 5' and a bracket 15. On the outer end of the shaft 14 is fixed a sprocket wheel 16, which is adapted to be driven by a sprocket rim 17 and a chain 18. The rim 17 is adapted to be secured to the rear hind wheel of a wagon, preferably on the inner side in any desired manner, as by means of clips 19, which encircle the spokes of the wheel and project through holes or openings 20 in the rim. Between the sprocket wheel 16 and the bracket 15 a clutch member 22 is slidably mounted, which is adapted to be moved into and out of engagement with a corresponding member 21 upon the inner face of the wheel 16. The clutch member 22 is adapted to be shifted longitudinally on the shaft 14 by means of a crank shaft 23, which is rotatably mounted in brackets 24 projecting outwardly from the post 5'. The crank-arm of the shaft is preferably connected with the clutch member 22 in any ordinary manner, and the upper end of the shaft is bent at an angle to form a handle 26, with which a rod 27 is connected, the forward end of said rod being connected with a lever 28 that is pivotally-mounted on a stud or bolt 29. The free end of this lever is preferably located adjacent to the driver's seat and is provided with an ordinary thumb latch 30, which controls a pawl or detent 31, which is adapted to be moved into and out of notches 32 near the ends of a segmental slot 33 of a rack 34.

A spring 35 is preferably mounted upon the shaft 14 between the clutch member 22 and the bracket 15, so as to assist in holding the clutch member 22 in engagement with the clutch member 21 and thereby prevent the accidental disengagement of the clutch which would stop the rotation of the spreading roller 8. A pinion 36 is mounted on a stud 37, secured in the outer face of the post 5' below the shaft 6, and is adapted to mesh with the gear wheel 12. A lever 38 is pivotally mounted on the member 2 of the frame, preferably by means of a bracket 39, and has its free end connected with a wrist pin 40 on the side of the pinion 36 by means of a link 41. The pivotal or forward end of the lever 38 is preferably formed as a slotted segment 42, through which a pivot bolt 43 is adapted to be adjustably secured, the inner end of the bolt being slidably connected with the bracket 39, as by means of a slot 44. A rod 45 is connected at its rear end with said bolt 43 and has its forward end connected with a lever 46, which is pivotally-connected at its lower end upon the bolt 29 and has its upper end provided with a thumb latch 47, which controls a pawl or detent 48, adapted to engage with teeth 49 upon the upper edge of said rack 34. Two pawls 50 are pivotally-connected with the lever 38, preferably by means of an adjustable block 51, so as to cause their free ends to engage with the teeth of a ratchet wheel 52 on one end of the shaft 7. The block 51 is preferably split longitudinally and held in its adjusted position in any desired manner, as by the screw or bolt 51' through the upper portion thereof, whereby the block can be clamped upon the lever in the well known manner. The pawls 50 are preferably of different lengths and they are constantly held in engagement with the teeth of the wheel 52 by means of spring 53. By constructing the parts in this manner a wide scope of adjustment is secured, for, by varying or adjusting the segment 42 the pawls can be moved toward or from the ratchet wheel 52 and thereby be caused to turn the wheel to a greater or less extent as the free end of the lever 38 is reciprocated by the link 41 and the wrist pin 40. This adjustment is permanent except by loosening the bolt 43, but the position of the pawls relative to the ratchet wheel can be varied so as to cause a greater or less rotation of the wheel by means of the hand lever 46, which pulls the pawls over toward the ratchet wheel when it is desired to increase the feed, or push them back so as to decrease the feed by decreasing the extent of engagement of the pawls with the ratchet wheel. After the adjustment is made by the lever 46, it is held there by releasing the latch 47 until it is again desired to change it when the lever 46 is released and moved in either direction and again locked by the latch.

The bottom of the machine or frame is preferably formed or provided with an endless conveyer or apron 54, which is mounted upon the roller 9 at the rear end and a similar roller 55 at the forward end, journaled between the side members 2 and 3. To prevent sagging of the upper length of the belt at its middle one or more rollers 56 may be journaled intermediately between the rollers 9 and 55, and cross rods 57 may also be extended between the bottom side pieces and between the upper and lower lengths of said conveyer.

As above described, it will be seen that our manure spreader can be manufactured at but slight cost and can be applied to an ordinary wagon by simply removing the ordinary bed from the wagon and replacing it with our bed and connecting the sprocket rim 17 with the spokes of the hind wheel. Its weight is very slight and it is very simple and effective.

Having described my invention, I claim:

1. In a manure spreader, a frame, a spreading roller journaled therein, means for actuating said roller including a gear wheel, an endless conveyer provided with a ratchet wheel, a slotted bracket, a lever having a slotted segment at one end, a bolt through said slots for adjustably mounting said lever on the bracket, pawls on the lever, a pitman connected with the free end of the lever, and a pinion in engagement with said gear wheel for actuating said pitman.

2. In a manure spreader, a frame, a spreading roller journaled therein, an endless conveyer, means for actuating said roller and conveyer, including a bracket, a shaft journaled in said frame and bracket, a gear at the inner end of said shaft, a sprocket wheel fixed to the outer end thereof and carrying a clutch member at its inner face, a spring-pressed slidable clutch member on said shaft, means connected with said slidable clutch member for throwing it into and out of operation, a gear on the shaft of said roller meshing with the first mentioned gear, a gear mounted on said frame and meshing with the gear on said roller shaft and connected to operate said conveyer, a sprocket rim adapted to be connected with a wheel of the wagon, and a sprocket chain passing over the sprocket wheel fixed to said clutch-carried shaft and over said sprocket rim.

3. In a manure spreader, a frame, a spreading roller journaled therein, an endless conveyer, means for actuating said roller and conveyer including an adjustable lever connected with said conveyer, clutch mechanism, intermeshing gears connected with said adjustable lever and said clutch mechanism, one of said gears being mounted on the roller shaft, brackets on the frame, a crank shaft journaled in said brackets and having the lower end thereof provided with means for controlling said clutch mechanism and the upper end formed into a handle, a slotted segmental rack provided with teeth and with a notch in one wall of said slot adjacent to each end, two levers pivotally connected with said rack, one of which is provided with a pawl for engaging the teeth of the rack and the other with a pawl for engaging said notches for locking it at either end of said slot, rods connecting the said levers with the adjustable lever and with the handle of the clutch operating shaft, respectively, and a sprocket chain operable by one of the wagon wheels and passing over one of said gears for imparting motion to the train.

In testimony whereof we have hereunto set our hands in presence of two subscribing witnesses.

ALEXANDER TURNER.
LEE HOWARD.

Witnesses:
JESSE MERICK,
RAY ALTERS.